(12) United States Patent
Katagiri et al.

(10) Patent No.: US 7,510,229 B2
(45) Date of Patent: Mar. 31, 2009

(54) VEHICLE BODY FRONT STRUCTURE OF SADDLE-RIDE TYPE VEHICLE

(75) Inventors: Kiyoshi Katagiri, Saitama (JP); Masamoto Ito, Saitama (JP); Takatsugu Kido, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/524,438

(22) Filed: Sep. 21, 2006

(65) Prior Publication Data

US 2007/0069545 A1    Mar. 29, 2007

(30) Foreign Application Priority Data

Sep. 26, 2005    (JP)    ............................. 2005-278871

(51) Int. Cl.
*B62J 17/04* (2006.01)
(52) U.S. Cl. .................... 296/78.1; 180/903; 296/180.1
(58) Field of Classification Search ................ 296/78.1, 296/180.1; 180/903
See application file for complete search history.

(56) References Cited

U.S. PATENT DOCUMENTS

| | | | | |
|---|---|---|---|---|
| 3,971,452 A | * | 7/1976 | Morelli ..................... | 296/180.1 |
| 4,633,965 A | * | 1/1987 | Tsurumi et al. ............. | 180/229 |
| 4,678,223 A | * | 7/1987 | Kishi et al. ................ | 296/78.1 |
| 4,703,825 A | * | 11/1987 | Mikami et al. ............. | 180/229 |
| 4,709,774 A | * | 12/1987 | Saito et al. .................. | 180/229 |
| 4,911,494 A | * | 3/1990 | Imai et al. .................. | 296/78.1 |
| 2002/0074820 A1 | * | 6/2002 | Gagne ......................... | 296/92 |
| 2006/0181891 A1 | * | 8/2006 | Surawichai et al. ......... | 362/474 |
| 2007/0024089 A1 | * | 2/2007 | Takeshita .................... | 296/192 |

FOREIGN PATENT DOCUMENTS

| | | | | | |
|---|---|---|---|---|---|
| DE | 26 00 616 | A1 | | 2/1977 | |
| DE | 3204664 | A | * | 8/1983 | ............... 296/180.1 |
| EP | 911249 | A | * | 4/1999 | ................ 296/78.1 |
| EP | 1688342 | A2 | * | 8/2006 | ................ 296/78.1 |
| JP | 64001671 | A | * | 1/1989 | ................ 296/78.1 |
| JP | 03061190 | A | * | 3/1991 | ................ 296/78.1 |
| JP | 03061192 | A | * | 3/1991 | ................ 296/78.1 |
| JP | 03065483 | A | * | 3/1991 | ................ 296/78.1 |
| JP | 06206586 | A | * | 7/1994 | ................ 296/78.1 |
| JP | 2001106144 | A | * | 4/2001 | ................ 296/78.1 |
| JP | 2003-81158 | A | | 3/2003 | |
| JP | 2006076459 | A | * | 3/2006 | ................ 296/78.1 |
| WO | WO 0192090 | A | * | 12/2001 | ................ 296/78.1 |

* cited by examiner

*Primary Examiner*—Glenn Dayoan
*Assistant Examiner*—Paul A Chenevert
(74) *Attorney, Agent, or Firm*—Birch, Stewart, Kolasch & Birch, LLP

(57) ABSTRACT

A vehicle body front structure for a saddle-ride type vehicle. A side upper part forming an upper surface is provided to a front cowl so that traveling wind flowing in a longitudinal direction of the body along the upper surface of the front cowl flows below the hand grips. The resulting structure reduces air resistance by wind pressure, secures windshield performance and reduces the weight of the front of the body.

22 Claims, 7 Drawing Sheets

VEHICLE BODY FRONT STRUCTURE OF SADDLE-RIDE TYPE VEHICLE

CROSS-REFERENCE TO RELATED APPLICATION

The present application claims priority under 35 U.S.C. §119 to Japanese Patent Application No. 2005-278871, filed Sep. 26, 2005, the entire contents of which are hereby incorporated by reference.

BACKGROUND OF THE INVENTION

1. Field of the Invention

The present invention relates to a vehicle body front structure of a saddle-ride type vehicle such as motorcycles.

2. Description of Background Art

In a vehicle body front structure in a related art, the front of a front cowl is inclined slightly backward from an upright state so that traveling wind from ahead of a vehicle can be guided upward or rightward and leftward (for example, refer to Patent Document 1, JP-A No. 2003-81158).

In the vehicle body front structure in the related art, as a direction of traveling wind greatly changes along the front of the front cowl though windshield performance by the front cowl is satisfactory, air resistance by the pressure on the front cowl of the traveling wind is easily increased. As a measure such as the strength of front cowl supporting parts is enhanced is required to resist the air resistance, the weight of the front of the body is easily increased.

SUMMARY AND OBJECTS OF THE INVENTION

The invention is made in view of the above-mentioned situation and the object is to reduce air resistance by wind pressure, securing windshield performance and to inhibit the weight of the front of the body in a vehicle body front structure of a saddle-ride type vehicle provided with a front cowl.

According to a first aspect of the present invention, a vehicle body front structure of a saddle-ride type vehicle (for example, a motorcycle 1 in an embodiment) is provided with a handlebar (for example, a handlebar 5 in the embodiment) and a front cowl (for example, a front cowl 41 in the embodiment) in the front of the body. An air introducing part (for example, a side upper part 47 in the embodiment) forming an upper surface is provided to the front cowl so that traveling wind flowing in a longitudinal direction of the body along the upper surface (for example, an upper surface 47a in the embodiment) of the front cowl flows below the handlebar. The saddle-ride type vehicle means the whole vehicle of a type that a rider strides over the body, includes not only a motorcycle, but also a three-wheeled or four-wheel vehicle. A saddle-ride type vehicle also includes a scooter-type vehicle provided with a low slung footrest.

According to a second aspect of the present invention, the air introducing part is formed from the front of the front cowl to the downside of the handlebar.

According to a third aspect of the present invention, the front cowl is provided with a mirror (for example, a mirror 56 in the embodiment) supported via a coupling part (for example, a stay 59 in the embodiment) and an upper surface (for example, an upper surface 59a in the embodiment) of the coupling part is substantially on the same plane as an upper surface of the air introducing part.

According to a fourth aspect of the present invention, the mirror is located below the handlebar.

According to the first aspect of the present invention, since traveling wind passing on the front cowl is rectified by the air introducing part and passes the downside of each arm of the rider, disturbed traveling wind hardly hits on an upper body of the rider. Thus, satisfactory windshield performance can be secured. As the air introducing part is formed in the longitudinal direction of the body, air resistance by the pressure of traveling wind passing on the front cowl can be inhibited, the strength of the front cowl supporting parts is optimized, and the front of the body can be lightened.

According to the second aspect of the present invention, since a distance for rectifying traveling wind can be extended, traveling wind can be more smoothly rectified and an effect upon the rider of traveling wind can be reduced.

According to the third aspect of the present invention, traveling wind can be also rectified on the upper surface of the coupling part and an effect upon the rider of traveling wind can be further reduced.

According to the fourth aspect of the present invention, an effect upon the upper body of the rider of the disturbance of traveling wind by the mirror can be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
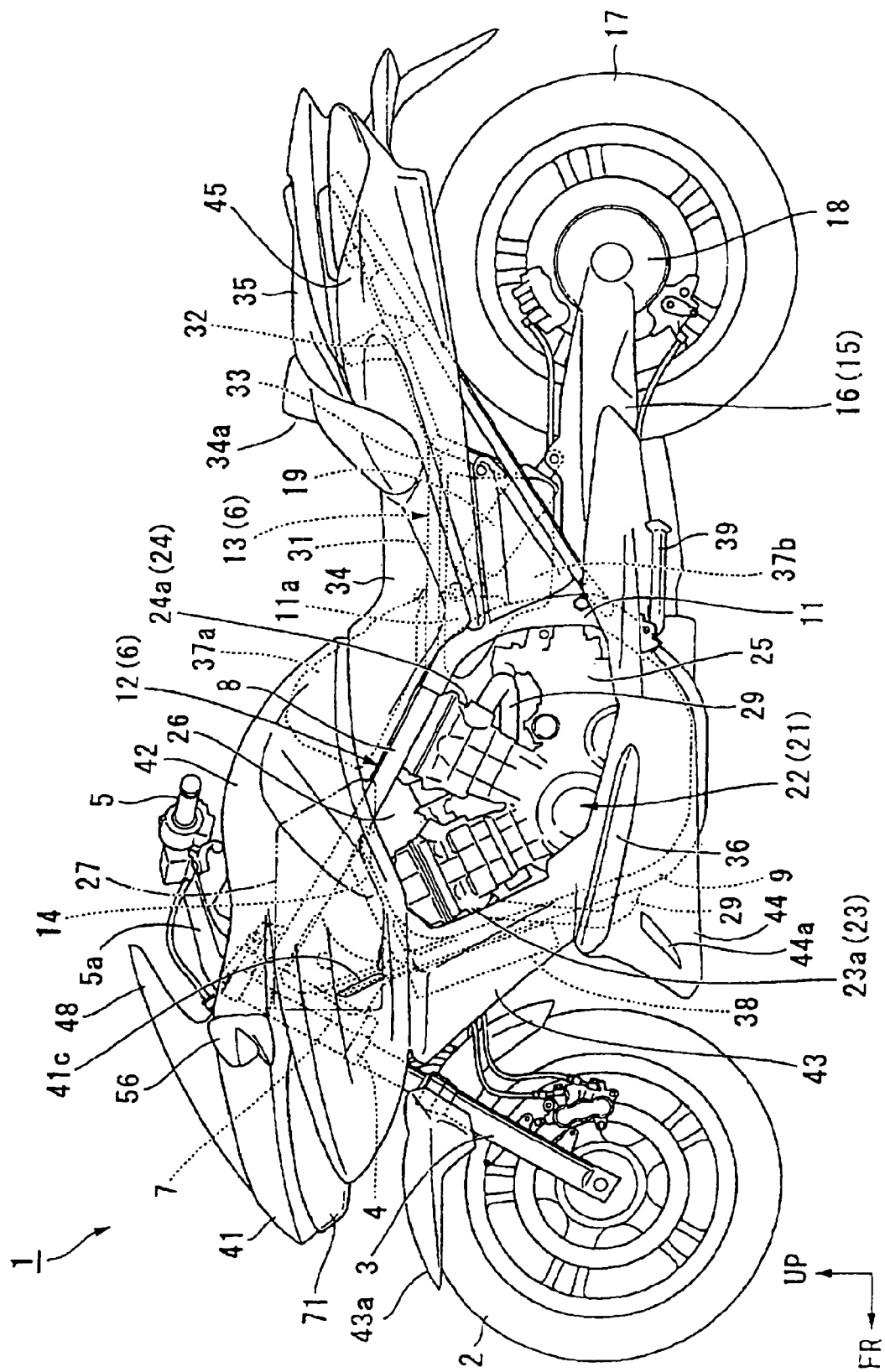
FIG. 1 is a left side view showing a motorcycle in an embodiment of the invention.

Referring to the drawings, an embodiment of the invention will be described below. A position such as the front, the rear, the right and the left in the following description shall be the same as that in a vehicle unless it is particularly described. An arrow FR in the drawings denotes a forward direction of the vehicle, an arrow LH denotes a left side of the vehicle, and an arrow UP denotes the upside of the vehicle.

Figure 2:
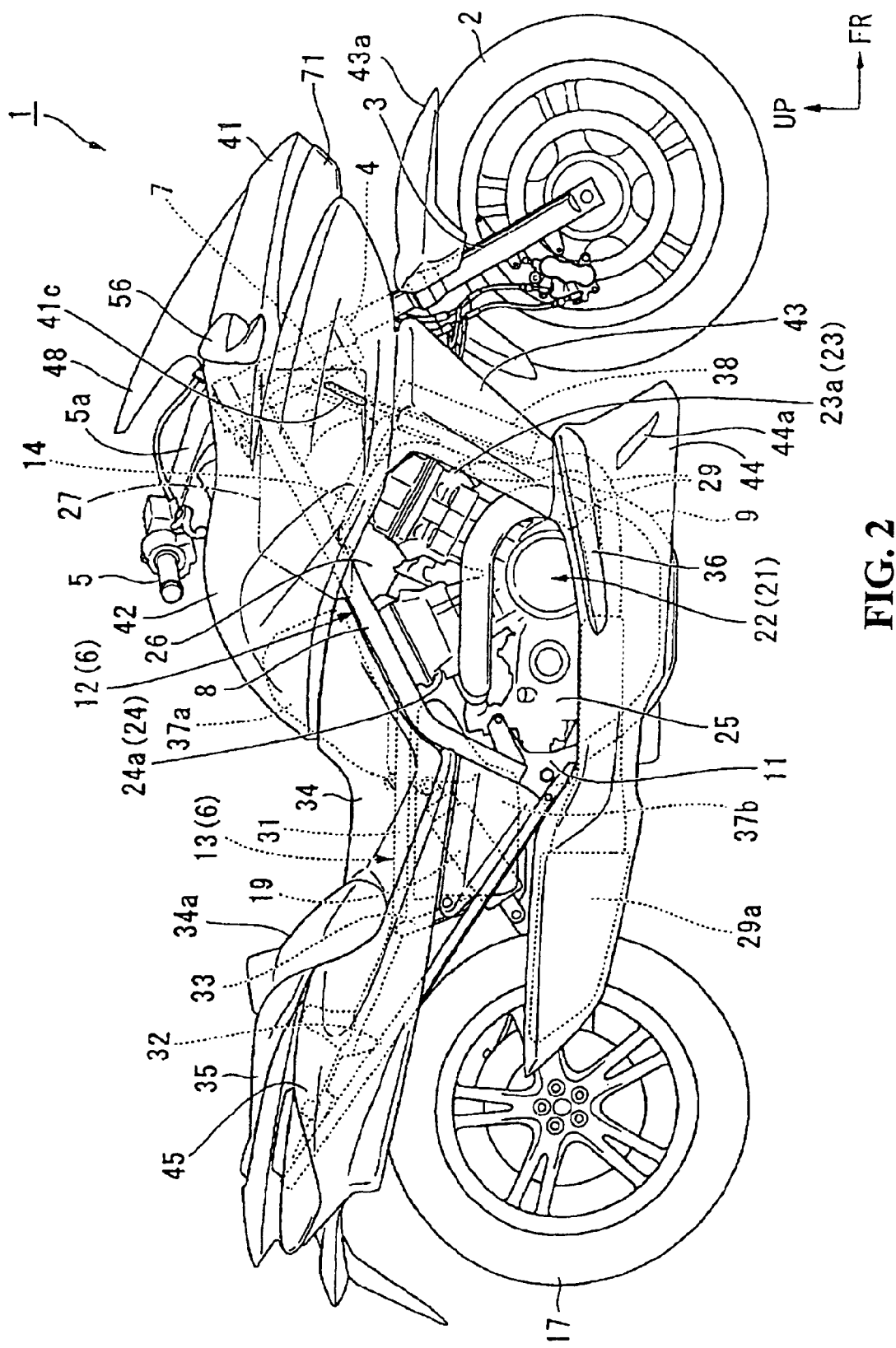
FIG. 2 is a right side view showing the motorcycle.

As shown in FIGS. 1 and 2, a front wheel 2 of a motorcycle (a saddle-ride type vehicle) 1 is supported by lower ends of a pair of right and left front forks 3. The upside of each front fork 3 is pivotably supported by a head pipe 7 at the front end of a body frame 6 via a steering stem 4 so that each front fork can be steered. Hand grips 5 for steering the front wheel 2 is attached to the upside of the steering stem 4 via a handlebar 5a. A pair of right and left main tubes 8 extend diagonally downward and backward from the upside of the head pipe 7. A pair of right and left down tubes 9 extend diagonally downward and backward in sharper inclination than the main tubes 8 from the downside of the head pipe 7. The fronts of the main tube 8 and the down tube 9 are connected via a gusset pipe 14 laid between the fronts.

Right and left asymmetrical pivot plates 11 are provided in an intermediate part in a longitudinal direction of the body frame 6. The left pivot plate 11 is vertically long, its upside is curved diagonally upward and forward, and the upside is connected to the rear end of the left main tube 8. The right pivot plate 11 is vertically short and the upside is connected to the rear end of the right main tube 8 extended to the right pivot plate 11. Rear ends of the right and left down tubes 9 are connected to the downsides of the right and left pivot plates 11. Hereby, a double cradle type main frame 12 is formed. The body frame 6 of the motorcycle 1 is formed mainly by the main frame 12 configured as described above and a seat frame 13 extended backward from the rear of the main frame 12.

The pivot plate 11 pivotably supports the front end of a swing arm 15 so that the swing arm 15 can be swung. The swing arm 15 is a cantilever type one arm 16 set on the left side of the body off the front end (a base) of which is extended backward and which supports a rear wheel 17 at the rear end (an end) of the arm 16. The arm 16 is hollow and a drive shaft not shown is inserted into the inside. A final gear case 18 is located at the rear end of the arm 16, and the drive shaft and the rear wheel 17 are linked via a bevel gear in the final gear case 18. A rear cushion unit 19 is arranged between an intermediate part in a longitudinal direction of the arm 16 and a cushion supporting part 11a in an upper part of the left pivot plate 11.

An engine 21 provided with a crankshaft parallel to a direction of the width of the body (a lateral direction) is mounted inside the main frame 12. The engine 21 is a narrow angle V-type two-cylinder engine in which a forward inclined cylinder 23 and a backward inclined cylinder 24 are installed upright on a crankcase 22. A transmission case 25 ranges in the rear of the crankcase 22, and the drive shaft and the engine 21 are linked via a bevel gear in an output part on the left side of the transmission case 25. Hereby, the transmission of power between the engine 21 and the rear wheel 17 via the drive shaft is enabled.

A throttle body 26 corresponding to each cylinder 23, 24 is arranged between banks of both cylinders 23, 24. The downstream side of each throttle body 26 is connected to an intake port in the rear of a forward inclined cylinder head 23a or an intake port in the front of a backward inclined cylinder head 24a, and the upstream side of each throttle body 26 is connected to an air cleaner box 27 located on the upside of the forward inclined cylinder 23.

An exhaust pipe 29 is led out of each exhaust port in the front of the forward inclined cylinder head 23a and in the rear of the backward inclined cylinder head 24a. Each exhaust pipe 29 is turned to the right side of the engine 21 to be one pipe and is connected to a silencer 29a on the right side of the vehicle body rear portion after one pipe is extended backward. The silencer 29a is extended substantially in the longitudinal direction and is provided so that the silencer is substantially overlapped with the swing arm 15 when the silencer is viewed from the side of the body.

The seat frame 13 mainly includes right and left upper seat rails 31 extended backward from the upside of the rear of the main frame 12 and right and left lower seat rails 32 extended diagonally upward and backward from the downside of the rear of the main frame 12. The rear ends of each seat rail 31, 32 are confluent and are connected at the rear end of the body. Intermediate parts in a longitudinal direction of each seat rail 31, 32 are connected via a rear gusset pipe 33 laid between these.

A front seat 34 for a rider and a rear seat 35 for a pillion passenger are supported by the front and the rear of the seat frame 13. A seated position of the front seat 34 is set to a relatively low position and a backrest 34a is arranged in a part having difference in a level between the front seat 34 and the rear seat 35. Both sides of the front end of the front seat 34 are extended forward along an upper edge of the main tube 8. Step boards 36 for the rider are provided on both sides of the front of the body so that the step board crosses the crankcase 22 and the down tube 9 when the step board is viewed from the side of the body.

A fuel tank of the motorcycle 1 is divided into an upper fuel tank 37a located in front of the front seat 34 and a lower fuel tank 37b biased on the downside and on the right side of the front seat 34. The upper fuel tank 37a is arranged between both legs of the rider seated on the front seat 34 and the lower fuel tank 37b is arranged between the front of the upper seat rail 31 and the front of the lower seat rail 32. A radiator 38 is laid between front edges of the right and left down tubes 9 and a folding type side stand 39 supports the body in a state in which the body is inclined on the left side.

A body cover mainly formed by parts made of resin is attached to the body of the motorcycle 1. The body cover mainly includes a front cowl 41 covering a range from a part in front of the head pipe 7 to both sides, a tank cover 42 ranging at the back of the front cowl 41 and covering the air cleaner box 27 and the upper fuel tank 37a, front side covers 43 extended downward from both lower parts of the front cowl 41 and covering the down tube 9 and the radiator 38, an under cover 44 covering a lower part of the engine 21, the exhaust pipe 29 and the silencer 29a, and rear side covers 45 covering both sides of the vehicle body rear portion.

Figure 3:
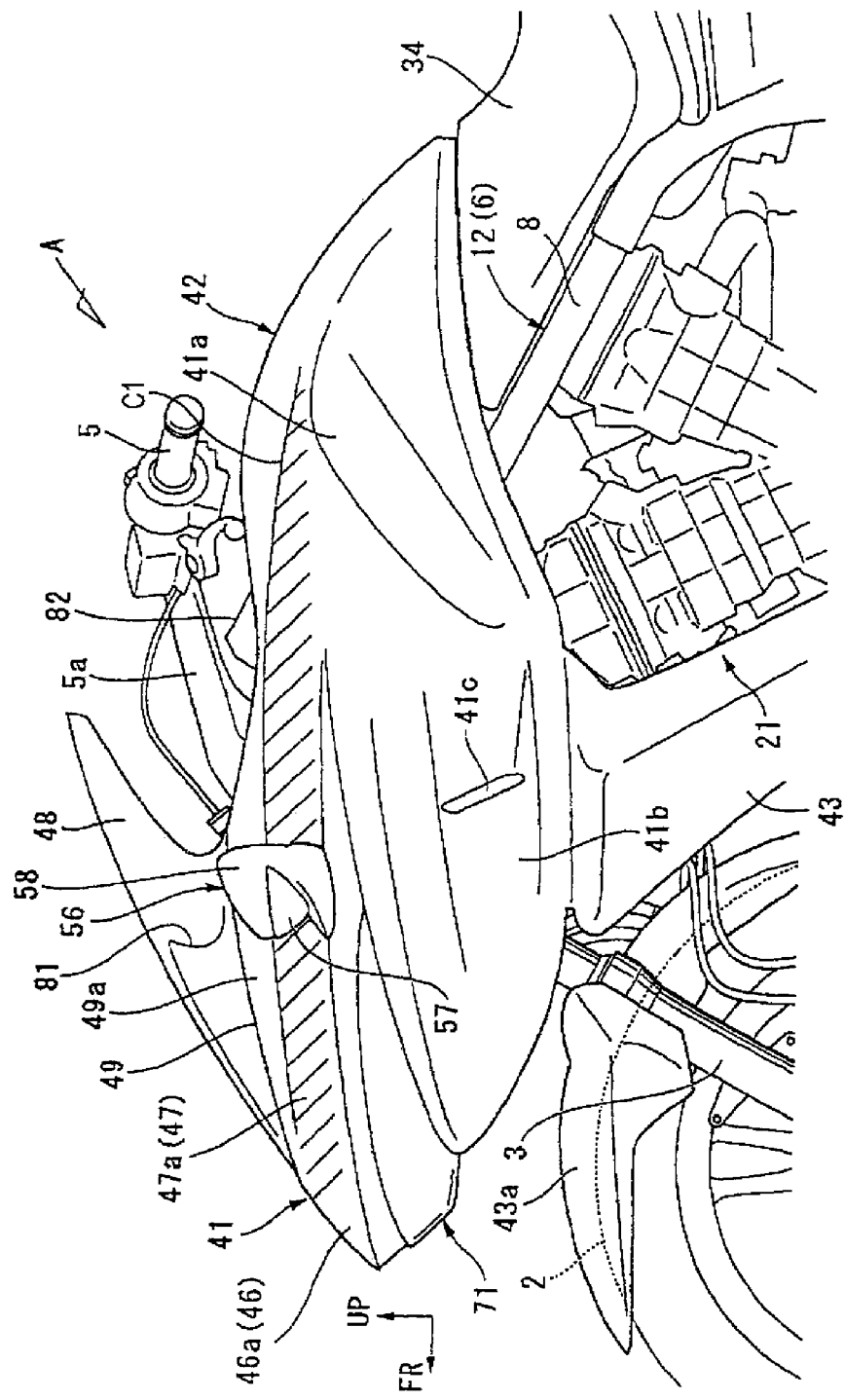
FIG. 3 is a left side view showing the front of the body of the motorcycle.
Figure 4:
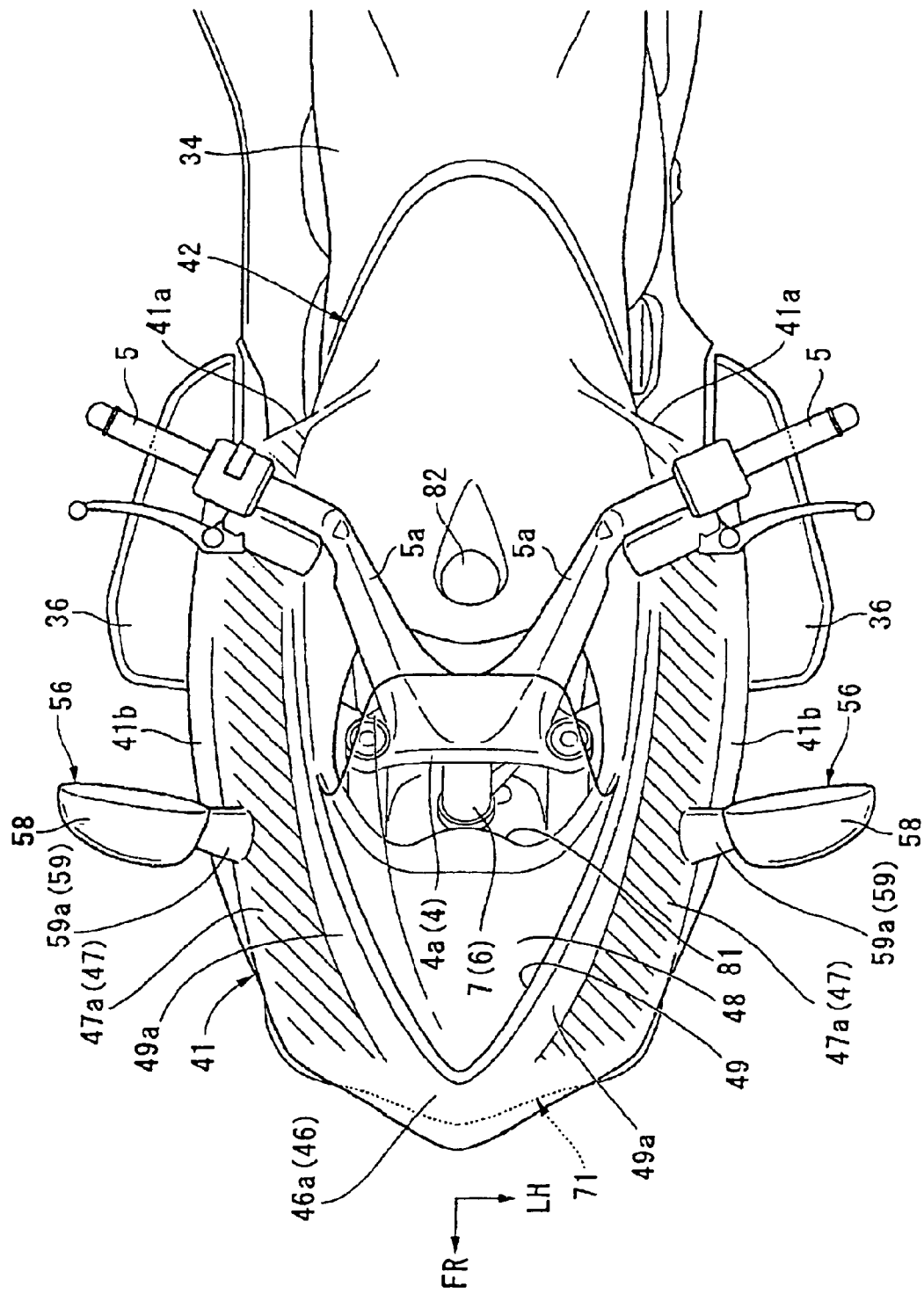
FIG. 4 is a top view showing the front of the body.

As shown in FIGS. 3 and 4, as for the front cowl 41, the front is extended forward so that the front is gently tapered from the circumference of the head pipe 7, while both sides of the rear are extended backward and are integrated with the tank cover 42 at the back of the head pipe 7. Width between the rears of the front cowl 41 is larger than the width similar to that of the front seat 34 of the tank cover 42 and a part having difference in a level 41a is respectively formed between both sides of the rear of the front cowl 41 and both sides of the tank cover 42. Both parts having difference in a level 41a cover both legs from ahead when the rider seated on the front seat 34 holds the tank cover 42 with his/her both legs.

A nose 46 forming a front end of the front cowl 41 is in a flat shape the thickness of which is inhibited and the width of which is widened and its upper surface 46a is slightly inclined so that the rear is higher. The front end of the nose 46 is formed so that it is convex forward in a top view, its both sides are curved backward, and range to cowl sides 41b forming both sides of the front cowl 41. The right and left cowl sides 41b are gently curved in a convex shape outside in the lateral direction and are slightly inclined so that mutual distance (equivalent to the width of the front cowl 41) is wider on the rear side.

A blowout duct 41c for reducing air resistance is provided to each intermediate part in a longitudinal direction of the right and left cowl sides 41b. Inlet ducts 44a for leading traveling wind passing the radiator 38 and enhancing engine cooling performance are provided on both sides of the front of the under cover 44 (see FIGS. 1 and 2).

Figure 5:
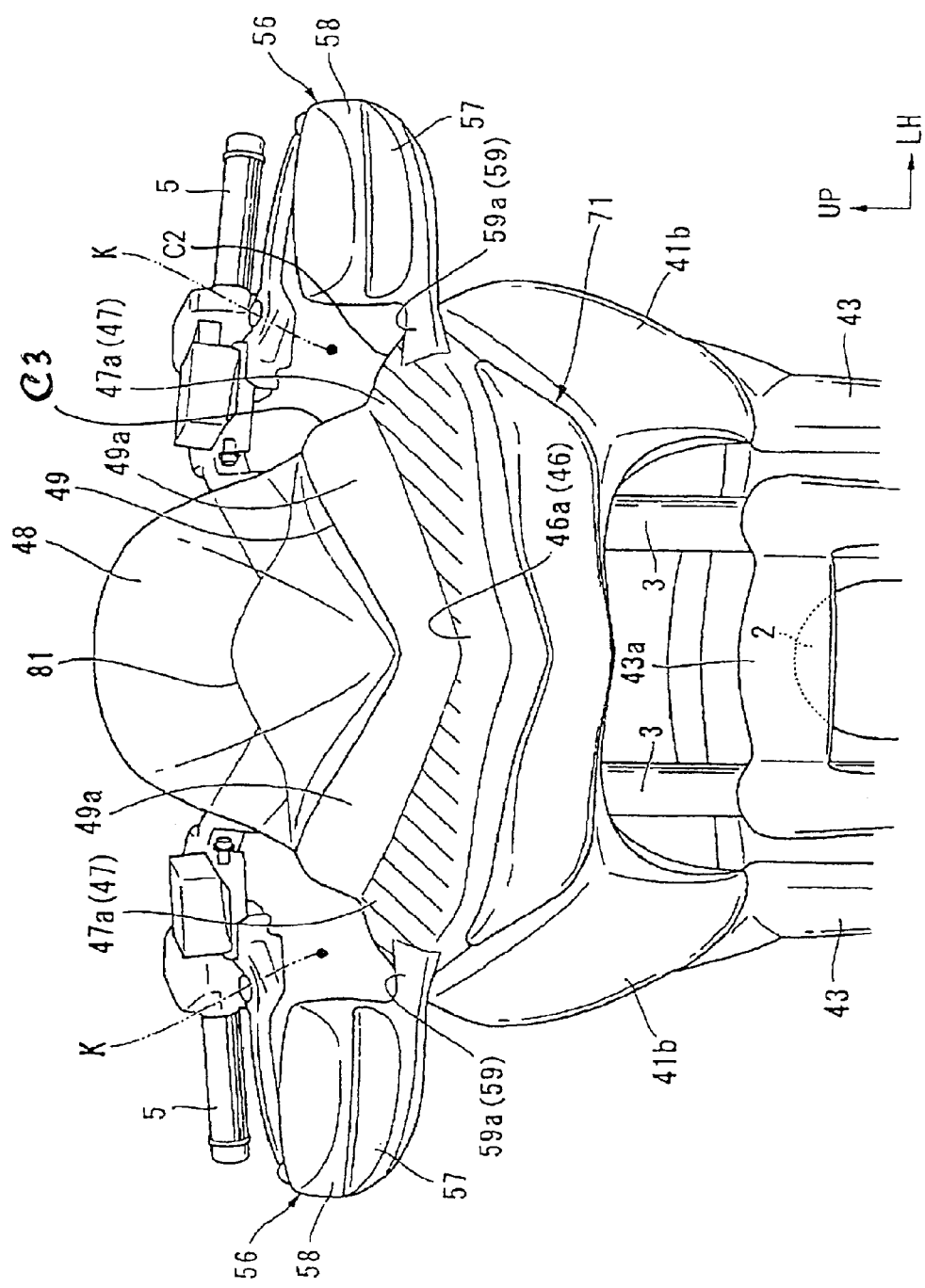
FIG. 5 is a front view showing the front of the body.

To explain also referring to FIG. 5, a head lamp 71 long sideways provided with a lens along the front end and both sides of the nose in a top view is arranged immediately under the nose 46. Space for arranging the front wheel in the center under the front cowl 41 is located under the head lamp 71. A reference numeral 43*a* denotes a front fender.

Right and left side upper parts (air introducing parts) 47 forming both sides of an upper part of the front cowl 41 range on both sides of the rear end of the nose 46. The right and left side upper parts 47 form upper surfaces 47*a* linearly extended substantially in a longitudinal direction in a side view, as can be seen in FIG. 3. Also as can be seen in FIG. 3, the upper surfaces 47*a* of the right and left side upper parts 47 are gently curved in a convex shape C1 upward in the side view, each front is inclined slightly upward, while each rear is formed along the longitudinal direction. As can be seen in FIG. 5, the right and left upper surfaces 47*a* are inclined so that the outside in the direction of the width of the body is lower in a front view and are curved in a convex shape C2 diagonally upward and outside. The right and left upper surfaces 47*a* configured as described above range to the upper surface 46*a* of the nose 46 and form a main upper surface of the front cowl 41. Right and left upright parts 49*a*, 49*a* are formed, respectively, at upper portions of the right and left side upper parts (air introducing parts) 47, 47. The right and left upright parts 49*a*, 49*a* are curved upwardly and outwardly in convex shapes C3, when seen in the front view (FIG. 5). Also, it can be seen that the convex shapes C2 are more gently curved than the convex shapes C3. Further, as can be seen in the side view of FIG. 3, the right and left side air introducing parts 47, 47 and the right and left upright parts 49*a*, 49*a* extend rearwardly along the front cowl 41 to positions further rearward than a rear end of the meter visor 48 and a rear end of the blowout duct 41*c*.

The hand grips 5 are made of right and left separate parts, and the right and left separate parts are arranged apart from a top bridge 4*a* backward and outside via handle bars 5*a* extended diagonally upward from an upper surface of the top bridge 4*a* of the steering stem 4 so that mutual distance is widened.

A cutout 49 open to space for installing the handlebar in front of the tank cover 42 is provided to the center of the upper part of the front cowl 41. The cutout 49 is convex forward in a top view and inside the cutout 49, a combination meter 81 in which a speedometer and a tachometer are integrated is arranged.

A meter visor 48 made of translucent resin is attached to the cutout 49 so that the meter visor closes the cutout. The meter visor 48 is arranged with the rear higher so that the meter visor has the similar inclination to that of the upper surface 46*a* of the nose 46 and is gently curved in a convex shape diagonally upward and forward. The front of the meter visor 48 is aligned to the cutout 49 and the rear is extended diagonally upward and backward to the extent that the rear is not in a front field of view of the rider. An upright part 49*a* uplifted so that the upright part follows the circumferential form of the meter visor 48 different in an inclination is provided in the vicinity of the circumference of the cutout 49 in the front cowl 41.

The right and left side upper parts 47 are extended from the rear end of the nose 46 to the rear end of the front cowl 41 (in other words, to each downside of the right and left hand grips 5). At this time, distance between the right and left side upper parts 47 is widened on the rear side so that the distance corresponds to a change in the width of the front cowl 41. The width of each side upper part itself 47 is larger on its front side and is narrowed on the rear side because the width of the meter visor 48 is narrower on its front side.

Figure 6:
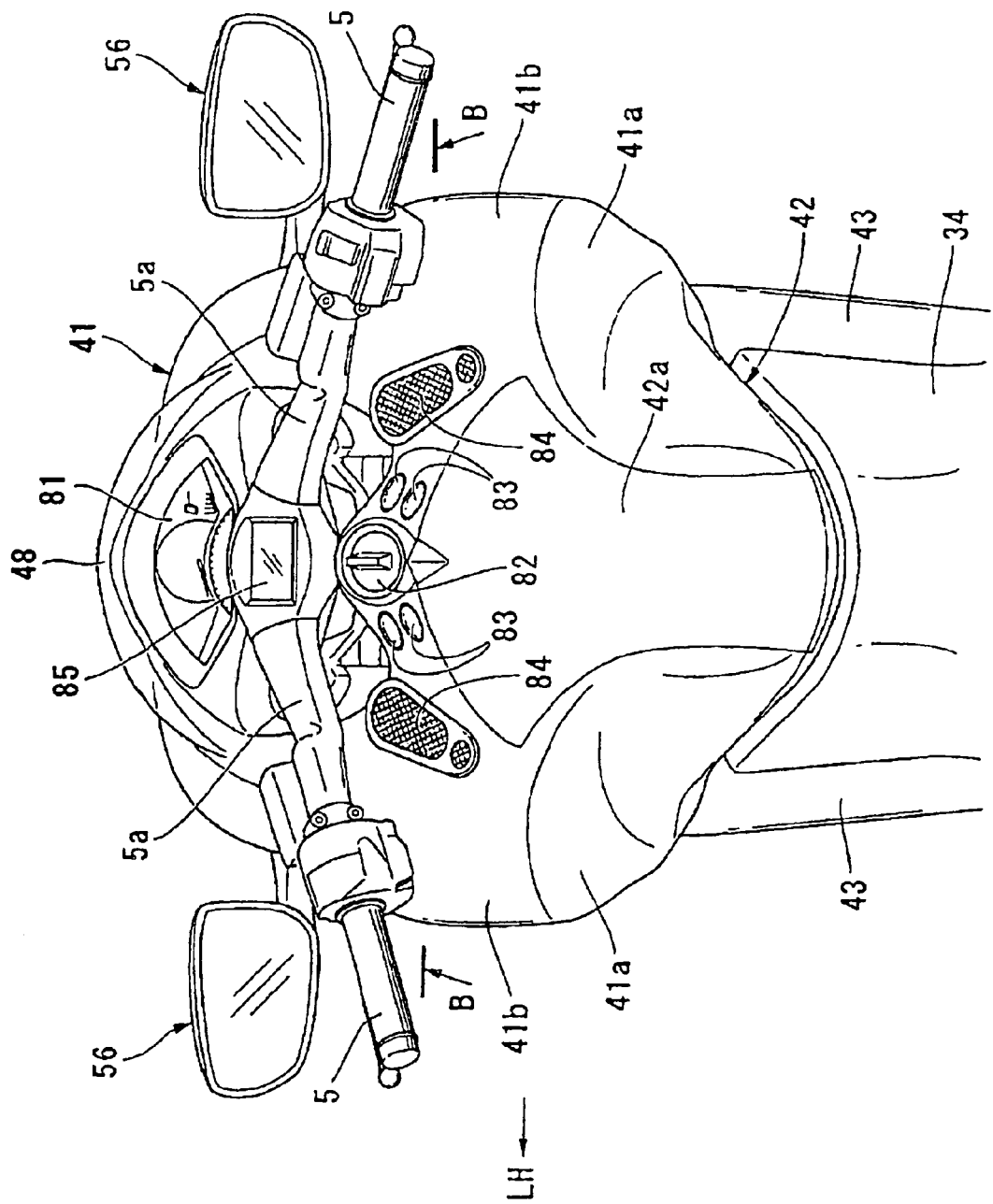
FIG. 6 is a view viewed from a direction shown by an arrow A in FIG. 3.

FIG. 6 shows the front of the body viewed from the vicinity of a rider's view point. To explain also referring to FIG. 6, a main switch 82 of the motorcycle 1 is arranged in the center on the front side of an upper part of the tank cover 42, various control switches 83 are arranged on both sides of the main switch, and speaker units 84 in an audio system are arranged on further both sides of the various control switches. An openable lid 42*a* is provided on the rear side of the upper part of the tank cover 42 and access to an oil filler port of the upper fuel tank 37*a* arranged inside the lid is enabled by opening the lid 42*a*. A monitor 85 in a car navigation system is arranged on the top bridge 4*a* and between bases of the right and left handle bars 5*a*.

Figure 7:
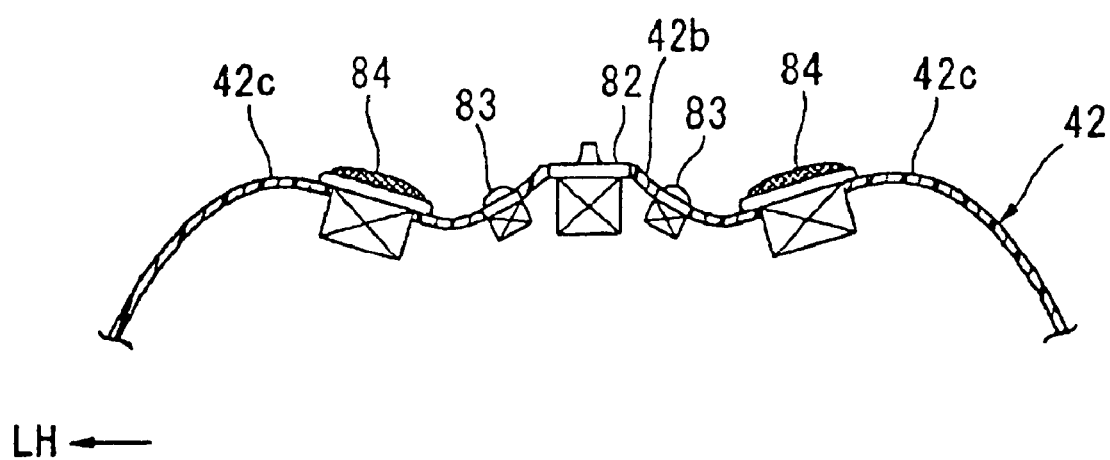
FIG. 7 is a sectional view viewed along a line B-B shown in FIG. 6.

To explain further referring to FIG. 7, as central and right and left projections 42*b*, 42*c* in a gentle upward convex shape are formed in the center and on both sides in the upper part of the tank cover 42 and the speaker units 84 are arranged on right and left inclined faces (inclined faces higher outside) of the right and left projections 42*c*, the front of the speaker unit 84 can be directed to the side of the rider without protruding the speaker units 84 from the tank cover 42 and sound for the rider is kept satisfactory.

As shown in FIGS. 3, 4 and 5, right and left mirrors 56 integrated with front indicators 57 are attached to both sides of the upper part of the front cowl 41 via each stay (coupling part) 59.

The right and left mirrors 56 support each body in each case 58 and include the front indicators 57. The case 58 is in a substantially rectangular shape long sideways in a front view and the outside on the downside is chamfered in the shape of an arc. The front of the case 58 is curved forward in a convex shape, the rear is open backward, and the body of the mirror is supported by the case 58 so that the open part is closed. The right and left mirrors 56 configured as described above are arranged in front of the top bridge 4*a* and below the right and left hand grips 5. The outside end of the stay 59 extended sideways is connected to the inside of a lower part of the case 58 and the inside end of the stay 59 is connected to the outside of an intermediate part in a longitudinal direction of the side upper part 47.

Each sectional shape of the right and left stays 59 is made vertically short and flat so as to reduce air resistance by traveling wind from the front of the vehicle. The right and left stays 59 are provided so that each upper surface 59*a* is located substantially at the same level as the upper surface 47*a* of the side upper part 47 and each upper surface 47*a*, 59*a* substantially forms one surface.

As the right and left hand grips 5, the right and left side upper parts 47 and the stays 59 are vertically apart when they are viewed from the front and clearance between them is held among each side and each upright part 49*a* of the meter visor 48 located inside and each case 58 located outside, tunnellike air introducing space K for passing traveling wind flowing along the upper surface 47*a* of the side upper part 47 backward is formed.

Traveling wind flowing along the upper surface of the front cowl 41 afterward flows at the similar level to an upper body of the rider. On the central side between the front cowls 41, the traveling wind flows backward along the upper surface of the meter visor 48 so that a direction of the flow is changed diagonally upward and backward, however, on both sides of the front cowls 41, the traveling wind flows backward along each upper surface 47*a* substantially in the longitudinal direction of the right and left side upper parts 47 without substantially changing a vertical direction of the flow, suitably being rectified.

The traveling wind flowing along each upper surface 47*a* of the right and left side upper parts 47 reaches the rear of the vehicle through each downside of both arms of the rider after the traveling wind passes the air introducing space K. That is, a hit of the traveling wind on the upper body of the rider is inhibited and air resistance by the pressure on the front cowl 41 of the traveling wind is inhibited.

As described above, the vehicle body front structure in the above-mentioned embodiment is applied to the motorcycle 1 provided with the hand grips 5 and the front cowl 41 in the front of the body, and the side upper part 47 forming the upper surface 47*a* is provided to the front cowl 41 so that traveling wind flowing in the longitudinal direction of the body along the upper surface 47*a* of the front cowl 41 flows on the downside of the hand grips 5.

According to this configuration, as traveling wind passing on the front cowl 41 is rectified by the side upper part 47 and passes the downside of each arm of the rider, disturbed traveling wind hardly hits on the upper body of the rider and satisfactory windshield performance can be secured. As the side upper part 47 is formed in the longitudinal direction of the body, air resistance by the pressure of traveling wind passing on the front cowl 41 can be inhibited, the strength of front cowl supporting parts is optimized, and the front of the body can be lightened.

In the vehicle body front structure, as distance for rectifying traveling wind can be extended because the side upper part 47 is formed from the front of the front cowl 41 to the downside of the hand grips 5, the traveling wind can be rectified more smoothly and an effect upon the rider of the traveling wind can be reduced.

Further, in the vehicle body front structure, as the front cowl 41 is provided with the mirror 56 supported via the stay 59 and the upper surface 59*a* of the stay 59 is substantially on the same plane as the upper surface 47*a* of the side upper part 47, traveling wind can be also rectified by the upper surface 59*a* of the stay 59 and further, an effect upon the rider of traveling wind can be reduced.

In addition, in the vehicle body front structure, as the mirror 56 is located below the hand grips 5, an effect upon the upper body of the rider by the disturbance by the mirror 56 of traveling wind can be avoided.

The invention being thus described, it will be obvious that the same may be varied in many ways. For example, the mirror 56 may be also separate from the front indicator, and the hand grips 5 may be also an integrated bar type. The invention can be also applied to a three-wheeled or four-wheel vehicle or a scooter-type vehicle. Such variations are not to be regarded as a departure from the spirit and scope of the invention, and all such modifications as would be obvious to one skilled in the art are intended to be included within the scope of the following claims.

What is claimed is:

1. A vehicle body front structure of a saddle-ride vehicle comprising:

a handlebar and a front cowl in a vehicle body front portion, the front cowl having right and left side air introducing parts that are gently curved upwardly and outwardly in convex shapes (C2) when seen in front view, and right and left side upright parts formed, respectively, at upper portions of the right and left air introducing side parts, the left and right side upright parts being curved upwardly and outwardly in convex shapes (C3) when seen in the front view; and a meter visor mounted at a cutout formed along upper edges of the right and left upright side parts of the front cowl, wherein the right and left side air introducing parts and the right and left side upright side parts form upwardly and outwardly facing surfaces so that traveling wind flowing in a longitudinal direction of the body along the upper upwardly and outwardly facing surfaces of the front cowl flows below the handlebar, wherein the right and left side air introducing parts and the right and left side upright parts extend rearwardly along the front cowl to positions further rearward than a rear end of the meter visor mounted on the front cowl.

2. The vehicle body front structure of a saddle-ride vehicle according to claim 1, wherein the right and left side air introducing parts extend from the front of the front cowl to positions beneath of the handlebar.

3. The vehicle body front structure of a saddle-ride vehicle according to claim 2, wherein the front cowl comprises right and left mirrors supported via right and left coupling parts; and upper surfaces of the coupling parts are substantially on the same plane as the upwardly and outwardly facing surfaces of the right and left side air introducing parts.

4. The vehicle body front structure of a saddle-ride vehicle according to claim 1, wherein the front cowl comprises right and left mirrors supported via right and left coupling parts; and upper surfaces of the coupling parts are substantially on the same plane as the upwardly and outwardly facing surfaces of the right and left side air introducing parts.

5. The vehicle body front structure of a saddle-ride vehicle according to claim 4, wherein the mirrors are located below the handlebar.

6. The vehicle body front structure of a saddle-ride vehicle according to claim 1, wherein the front of the front cowl extends forward so that the front is gently tapered from a circumference of a head pipe, while both right and left cowl sides of a rear of the front cowl extend backward and are integrated with a tank cover rearward of the head pipe.

7. The vehicle body front structure of a saddle-ride vehicle according to claim 1, wherein the right and left side air introducing parts form both sides of a part of the front cowl just below right and left side upright parts, and extend rearwardly along both sides from a rear end of a nose of the front cowl.

8. The vehicle body front structure of a saddle-ride vehicle according to claim 1, wherein the right and left upper surfaces of the right and left side air introducing parts are inclined so that an outside portion in a direction of body width is lower in the front view and are curved in the convex shape (C2) diagonally upwardly and outwardly.

9. The vehicle body front structure of a saddle-ride vehicle according to claim 1, wherein the front cowl comprises right and left mirrors mounted on the front cowl in positions substantially mid way along lengths of the right and left side air introducing parts in the longitudinal direction of the vehicle.

10. The vehicle body front structure of a saddle-ride vehicle according to claim 1, wherein each of the upper surfaces of the right and left side air introducing parts is gently curved upwardly in a convex shape (C1) when seen in side view, with front portions being inclined slightly upward, and rear portions being formed along the longitudinal direction.

11. The vehicle body front structure of a saddle-ride vehicle according to claim 1, wherein when seen in the front view the convex shapes (C2) of the right and left side air introducing parts can be seen to be more gently curved than the convex shapes (C3) of the right and left side upright parts.

12. A vehicle body front structure of a saddle-ride vehicle comprising:

a handlebar and a front cowl in a vehicle body front portion;
the front cowl having right and left side air introducing parts that are gently curved upwardly and outwardly in convex shapes (C2) when seen in front view, and
right and left side upright parts formed, respectively, at upper portions of the right and left air introducing side parts, the left and right side upright parts being curved upwardly and outwardly in convex shapes (C3) when seen in the front view,
wherein the right and left side introducing parts and the right and left side upright side parts form upwardly and outwardly facing surfaces of the front cowl so that traveling wind flowing in a longitudinal direction of the body along the upwardly and outwardly facing surfaces of the front cowl flows below the handlebar; and
a blowout duct for reducing air resistance is provided on an intermediate part in a longitudinal direction on each of right and left sides of the front cowl,
wherein the right and left side air introduction parts and the right and left side upright parts extend rearwardly along the front cowl to positions further rearward than a rear end of a meter visor mounted on the front cowl and a rear end of the blowout duct.

13. The vehicle body front structure of a saddle-ride vehicle according to claim 12,
wherein the right and left side air introducing parts extend from the front of the front cowl to positions beneath of the handlebar.

14. The vehicle body front structure of a saddle-ride vehicle according to claim 13,
wherein the front cowl comprises right and left mirrors supported via right and left coupling parts; and
upper surfaces of the coupling parts are substantially on the same plane upper as the upwardly and outwardly facing surfaces of the right and left side air introducing parts.

15. The vehicle body front structure of a saddle-ride vehicle according to claim 12,
wherein the front cowl comprises right and left mirrors supported via right and left coupling parts; and
upper surfaces of the coupling parts are substantially on the same plane as the upwardly and outwardly facing surfaces of the right and left side air introducing parts.

16. The vehicle body front structure of a saddle-ride vehicle according to claim 15,
wherein the mirrors are located below the handlebar.

17. The vehicle body front structure of a saddle-ride vehicle according to claim 12,
wherein the front of the front cowl extends forward so that the front is gently tapered from a circumference of a head pipe, while both right and left cowl sides of a rear of the front cowl extend backward and are integrated with a tank cover rearward of the head pipe.

18. The vehicle body front structure of a saddle-ride vehicle according to claim 12,
wherein the right and left side air introducing parts form both sides of a part of the front cowl just below right and left side upright parts, and extend rearwardly along both sides from a rear end of a nose of the front cowl.

19. The vehicle body front structure of a saddle-ride vehicle according to claim 12,
wherein the right and left upper surfaces of the right and left side air introducing parts are inclined so that an outside portion in a direction of body width is lower in the front view and are curved in the convex shape (C2) diagonally upwardly and outwardly.

20. The vehicle body front structure of a saddle-ride vehicle according to claim 12,
wherein the front cowl comprises right and left mirrors mounted on the front cowl in positions substantially mid way along lengths of the right and left side air introducing parts in the longitudinal direction of the vehicle.

21. The vehicle body front structure of a saddle-ride vehicle according to claim 12, wherein each of the upper surfaces of the right and left side air introducing parts is gently curved upwardly in a convex shape (C1) when seen in side view, with front portions being inclined slightly upward, and rear portions being formed along the longitudinal direction.

22. The vehicle body front structure of a saddle-ride vehicle according to claim 12, wherein when seen in the front view the convex shapes (C2) of the right and left side air introducing parts can be seen to be more gently curved than the convex shapes (C3) of the right and left side upright parts.

* * * * *